(12) United States Patent
Priley (10) Patent No.: US 6,488,976 B1
(45) Date of Patent: Dec. 3, 2002

(54) METHOD AND APPARATUS FOR BREWING TEA WITH AN ESPRESSO MACHINE

(75) Inventor: Anthony P. Priley, Roseville, CA (US)

(73) Assignee: Affinitea Brewing Technologies, Inc., Roseville, CA (US)

( * ) Notice: Subject to any disclaimer, the term of this patent is extended or adjusted under 35 U.S.C. 154(b) by 0 days.

(21) Appl. No.: 09/460,229

(22) Filed: Dec. 13, 1999

(51) Int. Cl.[7] ................................................ A23F 3/16
(52) U.S. Cl. ........................ 426/435; 426/425; 426/431; 426/432; 426/433
(58) Field of Search ........................ 99/323, 299, 306, 99/305; 426/435, 425, 431, 432, 433

(56) References Cited

U.S. PATENT DOCUMENTS

| | | |
|---|---|---|
| 674,446 A | 5/1901 | Marx |
| 1,666,106 A | 4/1928 | Norman ............... 30/141 |
| 2,859,515 A | 11/1958 | Kinman ............... 30/141 |
| 3,599,557 A | 8/1971 | Leal ............... D7/309 |
| D259,533 S | 6/1981 | Frodsham ............... D7/42 |
| 4,709,625 A | 12/1987 | Layre ............... 99/289 |
| D299,999 S | 2/1989 | Pandolfi ............... D7/42 |
| D300,597 S | 4/1989 | Pandolfi ............... D7/309 |
| 4,882,982 A | 11/1989 | Muttoni |
| D317,103 S | 5/1991 | Case ............... D7/643 |
| 5,025,714 A | 6/1991 | Brewer ............... 99/300 |
| 5,070,773 A | 12/1991 | Salomon ............... 99/307 |
| 5,127,318 A | 7/1992 | Selby ............... 99/295 |
| 5,150,645 A | 9/1992 | Schiettecatte ............... 99/295 |
| 5,197,373 A | 3/1993 | De Jong ............... 99/280 |
| 5,265,518 A | 11/1993 | Reese ............... 99/280 |
| 5,267,506 A | 12/1993 | Cai ............... 99/289 |
| 5,337,652 A * | 8/1994 | Fischer et al. ............... 99/282 |
| 5,408,918 A | 4/1995 | King ............... 210/455 |
| 5,447,631 A | 9/1995 | Mahlich ............... 99/285 |
| 5,463,933 A | 11/1995 | Landais ............... 99/292 |
| 5,463,935 A | 11/1995 | Zanarini ............... 99/295 |
| 5,598,764 A | 2/1997 | Bambi ............... 99/295 |
| 5,638,741 A * | 6/1997 | Cisaria ............... 99/295 |

FOREIGN PATENT DOCUMENTS

| | | | |
|---|---|---|---|
| EP | 0339292 | * | 3/1989 |
| EP | 0777991 | * | 6/1997 |

* cited by examiner

*Primary Examiner*—Anthony J. Weier
(74) *Attorney, Agent, or Firm*—Heisler & Associates (57) ABSTRACT

A method and apparatus for brewing tea is set forth which utilizes heated water from a boiler 7 of an espresso machine 10. A porta-filter 20 having a brewing chamber 40 therein is attachable to a group head 12 of the espresso machine 10. A drain 38 from the brewing chamber 40 leads to an outlet tube 100. An outlet valve 120 restricts outflow from the brewing chamber to a rate less than inflow of heated water from the boiler 7. This facilitates infusion of the heated water with soluble flavor particles from a brewable substance such as tea leaves T before the heated water is discharged from the brewing chamber 40. The brewing chamber 40 is provided at an enhanced pressure relative to atmospheric pressure to enhance the brewing process within the brewing chamber 40.

31 Claims, 6 Drawing Sheets

METHOD AND APPARATUS FOR BREWING TEA WITH AN ESPRESSO MACHINE

FIELD OF THE INVENTION

The following invention relates to beverage brewing devices such as espresso machines which include boilers therein for delivering heated water to a brewing chamber and which discharge a brewed beverage. More specifically, this invention relates to attachments to espresso machines and modifications to espresso machines which allow the espresso machine to more effectively perform a greater number of brewed beverage preparation tasks including the brewing of tea.

BACKGROUND OF THE INVENTION

Espresso machines are a familiar sight in restaurants and coffee houses throughout the world. While espresso machines come in a variety of different configurations, the basic characteristics and functions of the espresso machine are consistent. The basic espresso machine includes a boiler which can boil water and discharge water for use in brewing a beverage. The espresso machine includes a water exit which is typically called a group head. The group head is configured so that a porta-filter can be securely attached in a sealing manner over the exit. The porta-filter includes a brewing chamber therein which is removable from the espresso machine along with the porta-filter. A brewable substance, most commonly very finely ground espresso beans, is placed within the brewing chamber of the porta-filter and the porta-filter is connected to the group head. The espresso machine is then activated, causing heated water just slightly below boiling temperature to be drawn through the ground espresso beans within the brewing chamber. An outlet from the porta-filter extends down beneath the porta-filter and the espresso beverage is collected within a small pitcher, called a demutante, which rests upon a drain tray of the espresso machine which extends away from a front of the espresso machine and beneath the group head. The espresso is most commonly diluted with various other beverage components to create a variety of different beverages.

While the basic espresso machine and porta-filter configuration is effective for brewing espresso, it suffers from numerous drawbacks. Specifically, the espresso machine cannot be utilized in its known prior art configurations to effectively brew tea, herbs, spices and coffee from ground coffee beans. When espresso beans are finely ground and used within known prior art espresso machines, the finely ground espresso beans are compressed within the brewing chamber. By compressing the espresso grounds, the espresso grounds initially block holes which provide an exit from the brewing chamber. When the espresso machine is activated to direct heated water into the brewing chamber, the heated water cannot initially pass through the outlet holes. Hence, pressure builds up and the water is rapidly infused by the espresso grounds in this high temperature, high pressure environment. Once the heated water has soaked through the compressed espresso grounds and reached the outlet holes, it has been fully brewed into espresso and is ready for discharge out of the outlet of the porta-filter.

In contrast to this espresso brewing process, tea is formed from tea leaves and herbs and spices are similarly formed from various different structures such as tree bark, flower petals, leaves and other natural structures distinct from a ground up bean. These structures are damaged and less effectively infuse dissolved flavor particles into heated water when they are highly compressed. Similarly, coffee beans are most effectively infused into heated water when the coffee bean grounds are not compressed. Additionally, tea leaves, herbs, spices and coffee grounds are most effectively infused into heated water when they are provided with residence time of a sufficient amount adjacent the heated water to fully extract the desirable flavor components from the brewable substance. Hence, utilization of such non-compressed brewable substances within an espresso machine does not effectively occur. Should brewable substances, such as tea leaves, be placed within the brewing chamber of a known prior art espresso machine, the heated water would pass through the brewing chamber too quickly and result in only partial extraction of tea flavor components from the tea leaves and only partial infusion of the heated water with the desired flavor components, when compared to known prior art tea brewing processes. Hence, a need exists for an espresso machine and attachments to an espresso machine which allow the espresso machine to brew a beverage which is brewed from a brewable substance which does not need to be compressed within a brewing chamber and which allows the brewing process to occur in a slower more controlled manner for proper residence time to complete the brewing process.

Additionally, because espresso machines are particularly configured to brew espresso and deliver the espresso into a demutante resting on the drain tray, only a very small space is provided between the drain tray and the porta-filter when the porta-filter is attached to the group head and in use along with the espresso machine. Delivery of the espresso into a demutante on the drain tray adds additional complexity to any overall drink preparation process in that the espresso or other beverage collected in the demutante on the drain tray must later be transferred into the beverage container, such as a glass, for serving to the customer. While devices are known to provide a limited amount of deflection of a beverage laterally after the beverage is discharged from the brewing chamber in the porta-filter, such known prior art deflection systems are inadequate to provide an operator of the espresso machine with maximum efficiency in preparation of drinks utilizing the espresso machine.

Often drinks made utilizing an espresso machine have at least two distinct components. For instance, espresso can be mixed with steamed milk to produce a "latté." It is often desirable to layer such drinks by placing a deflection surface such as a spoon, adjacent a top surface of a first ingredient of the beverage and then direct the second ingredient of the beverage onto the top surface of the spoon so that it pools in a distinct layer on top of the layer composed by the first ingredient of the beverage.

Prior art devices for effectively layering a drink, such as a spoon or other specific layering tool, do not work directly with the espresso machine. Rather, they require that multiple different tools be used separately in multiple stages before the final beverage is ready to be served to the customer. These individual devices must then be provided with a place for storage, further hampering the overall operation of the espresso machine and the delivery of beverages to the customer. Accordingly, a need exists for an attachment to an espresso machine which allows a layered beverage to be produced in a single step without requiring additional layering tools in addition to the espresso machine and porta-filter combination.

SUMMARY OF THE INVENTION

A prior art espresso machine and related attachments are modified by this invention to allow the espresso machine to be utilized in brewing non-espresso beverages such as tea, herbs, spices and coffee. The espresso machine includes a boiler for producing heated water and delivers heated water to a group head. The group head extends down from an overhang of the espresso machine and overlies a drain tray. The group head is configured so that a porta-filter can be attached to the group head and heated water from the boiler can pass through the group head and exit into the porta-filter. The porta-filter includes a brewing chamber therein which supports a brewable substance such as tea leaves, herbs, spices and coffee grounds. A drain in the porta-filter directs the brewed beverage out of the brewing chamber for release from the porta-filter and collection in a beverage container.

For brewing tea and the like, the brewing chamber is loaded with tea leaves, or tea within a tea bag or other infusion container, and the porta-filter is attached to the group head of the espresso machine. Heated water from the boiler of the espresso machine is then directed into the brewing chamber and brought into contact with the tea leaves for infusion of tea into the heated water.

Before the water is released from the porta-filter and passes into the beverage container, a water outflow restriction device must be passed by the water, which is now in the form of a beverage such as tea. This outflow restriction device restricts the beverage to a flow rate which is less than an inflow rate of heated water from the boiler into the brewing chamber. Hence, the water flowing through the brewing chamber backs up behind the outflow restriction device and residence time for the heated water adjacent the tea leaves is increased. The amount of residence time that the water experiences adjacent the tea leaves within the brewing chamber depends upon the difference between the flow rate through the outflow restriction device and the flow rate leaving the boiler of the espresso machine and passing into the brewing chamber.

In addition to enhanced residence time caused by the beverage outflow restriction device, the porta-filter is configured to sealingly attach to the group head in a manner which allows the brewing chamber to be maintained at a pressure which is elevated with respect to atmospheric pressure surrounding the espresso machine. At elevated pressure, infusion of tea into the heated water is increased. Also, turbulence can be generated within the brewing chamber by manipulation of flow rates through the outflow restriction device and inflow into the brewing chamber from the espresso machine. Turbulence can also be generated by optional inclusion of a restriction plate between the brewing chamber and the group head to add velocity to heated water entering the brewing chamber. Such turbulence further enhances the rate of infusion of dissolved tea flavor particles into the heated water for preparation of the beverage.

As tea and related beverages are often brewed at an initial drinking consistency and do not require later dilution or other modification, it is desirable that the beverage, after having been brewed within the brewing chamber, be passed directly into a beverage container for serving to a customer. With the presence of the drain tray on the espresso machine and the overhang above the drain tray, an outlet tube is beneficially provided which couples to the drain in the brewing chamber and extends laterally away from the the drain tray. The outlet tube can be positioned overlying a beverage container resting upon a counter upon which the espresso machine rests.

The outlet tube preferably is not affixed to the porta-filter in an immobile manner. Rather, the outlet tube is connected by a ball joint to a discharge of the porta-filter which allows the outlet tube to pivot both vertically and horizontally to a variety of different positions overlying the counter upon which the espresso machine rests and away from the drain tray. Additionally, the outlet tube can be formed from a semi-flexible tubular material which allows a lower end of the outlet tube to be located in a variety of different positions relative to the porta-filter. The outflow restriction device, which beneficially enhances residence time of heated water adjacent the brewable substance such as tea, is preferably in the form of a manually adjustable valve located adjacent the lower end of the outlet tube.

When a user of the espresso machine, as modified by this invention, wishes to create a layered drink of two distinct substances, a layering tool is attached to the outlet tube adjacent the lower end. The layering tool includes a concave spoon attachment which lies beneath the lower end. The outlet tube and concave spoon attachment can be located within a beverage container with the spoon at the approximate level of the first layer of the beverage. The second layer of the beverage is then passed through the outlet tube and impacts the spoon attachment where it is deflected horizontally and forms a distinct second layer resting upon the first layer of the beverage. The spoon attachment of the layering tool can be pivoted away from the lower end of the outlet tube when it is not in use and to assist in removal of the layering tool from the beverage container after the layered beverage has been created.

OBJECTS OF THE INVENTION

Accordingly, a primary object of the present invention is to provide a method for brewing tea with heated water originally provided by a boiler of an espresso machine.

Another object of the present invention is to provide an apparatus for use with an espresso machine to allow tea to be brewed with an espresso machine.

Another object of the present invention is to provide a method and apparatus for brewing beverages from herbs and spices using an espresso machine.

Another object of the present invention is to provide modifications to an espresso machine and components used with the espresso machine which allows coffee to be brewed with the espresso machine.

Another object of the present invention is to provide a device which can brew tea from loose tea leaves without requiring that the tea leaves be enclosed within an infusion ball, tea bag or other enclosure.

Another object of the present invention is to provide an espresso machine which can brew other beverages, besides espresso from finely ground espresso beans, to enhance the usefulness of the espresso machine in restaurants and coffee shops.

Another object of the present invention is to provide an attachment to an espresso machine which allows a beverage brewed with heated water from the espresso machine to be passed directly into a beverage container for serving to a customer.

Another object of the present invention is to provide an attachment to an espresso machine which allows a beverage to be discharged from the espresso machine at a variety of different locations spaced from a drain tray of the espresso machine.

Another object of the present invention is to provide an espresso machine which includes a layering tool thereon to assist in the manufacture of layered drinks.

Another object of the present invention is to provide an attachment to an espresso machine in which beverages can be brewed which require that heated water be given residence time adjacent a non-compacted brewable substance with residence time adjacent the brewable substance controlled by an adjustable valve such that beverages having different concentrations can be manufactured by a user of the espresso machine be adjustment of the valve.

Another object of the present invention is to provide an aeration nozzle for an outlet of an espresso machine to aerate beverages brewed by the espresso machine, such that a beverage with a unique appearance and taste can be created.

Another object of the present invention is to provide a porta-filter which can support tea leaves therein for brewing of the tea leaves and which can attach to an espresso machine with the porta-filter allowing sufficient residence time therein for infusion of heated water from the espresso machine with tea, to produce a tea beverage discharged from the porta-filter.

Other further objects of the present invention will become apparent from a careful reading of the included drawing figures, the claims and detailed description of the invention.

DESCRIPTION OF THE PREFERRED EMBODIMENT

Referring to the drawings wherein like reference numerals represent like parts throughout the various drawing figures, reference numeral 10 is directed to an espresso machine (FIG. 5) to which a porta-filter 20 can be attached for brewing of a variety of different beverages V including tea. The espresso machine 10 and porta-filter 20 are modified from a prior art espresso machine 10 and porta-filter P (FIG. 6) so that other beverages V such as tea can be brewed, not merely espresso.

Figure 2:
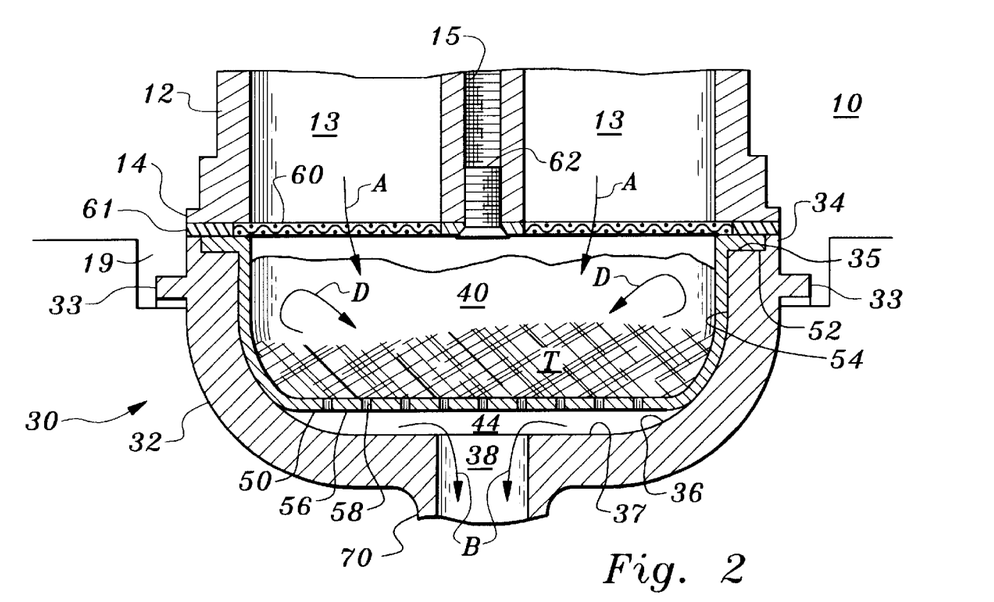
FIG. 2 is a full sectional view of a portion of a porta-filter of this invention, according to a preferred embodiment, attached to the group head of the espresso machine, the porta-filter including a tea support insert upon which tea leaves are supported during a brewing process.
Figure 3:
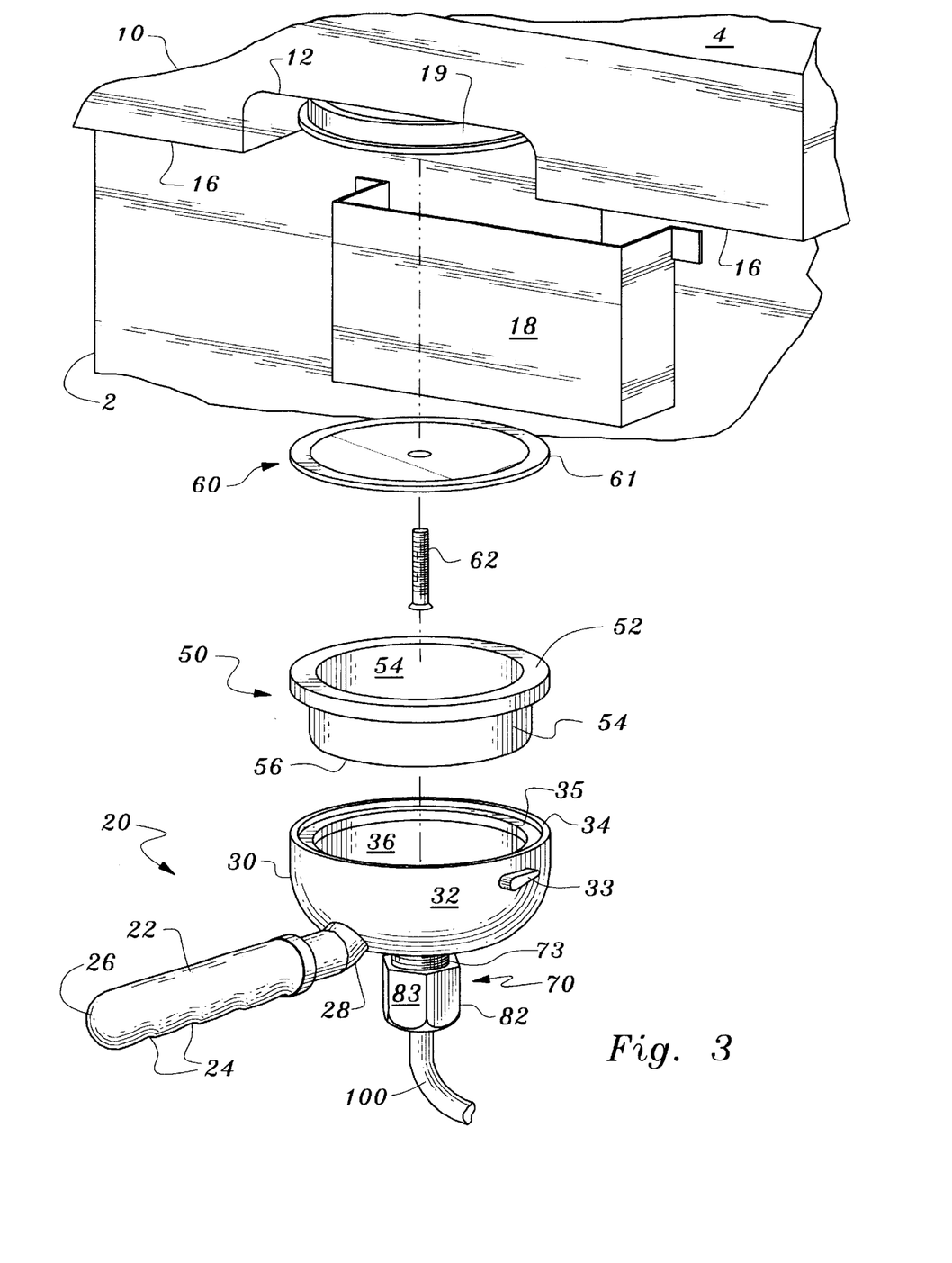
FIG. 3 is a perspective exploded view of the porta-filter shown in FIG. 2 and portions of the espresso machine, revealing how the porta-filter and tea support insert are nested together and attached to the group head of the espresso machine.
Figure 4:
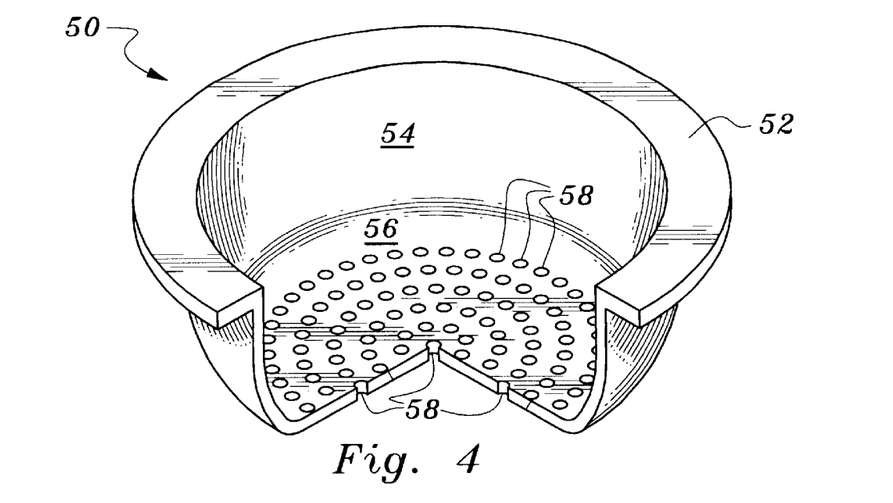
FIG. 4 is a perspective view of the tea support insert of this invention with portions cut away to reveal interior details thereof.
Figure 5:
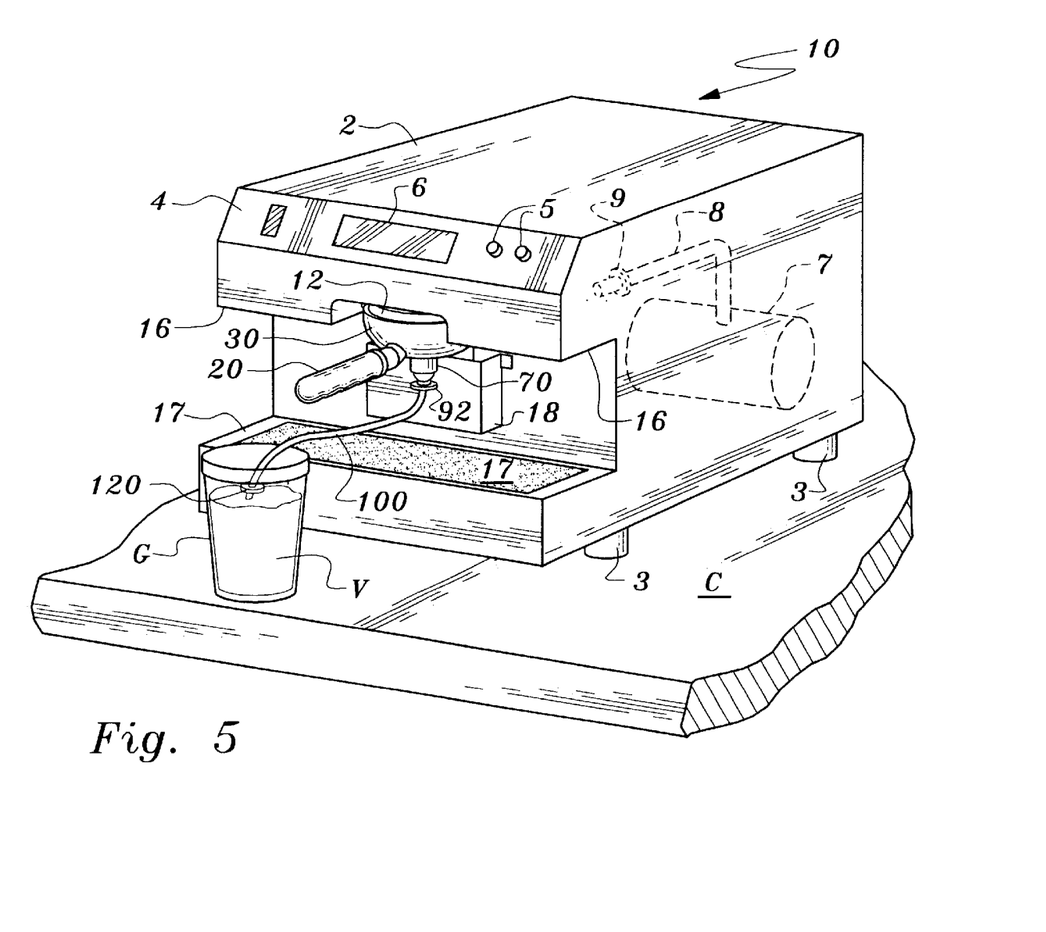
FIG. 5 is a perspective view of the porta-filter of this invention attached to a group head of an espresso machine with the espresso machine resting upon a counter and with a glass also resting upon the counter and receiving a beverage directly therein which is being brewed within the porta-filter.

In essence, and with particular reference to FIGS. 2, 3, and 5, details of the espresso machine 10 and porta-filter 20 which facilitate the brewing of tea and other non-espresso beverages V with the espresso machine 10 are described. The espresso machine 10 includes a boiler 7 which can direct heated water through a group head 12 to a porta-filter 20 attached to the group head 12. The porta-filter 20 includes a brewing enclosure 30 with a rim 34 which seals with an attachment bracket 19 of the group head 12 (FIG. 2). The brewing enclosure 30 includes a brewing chamber 40 therein in which tea leaves T or other brewable substances can be located. A tea support insert 50 (FIG. 2) can be located within the brewing chamber 40 to provide a separate support for the tea leaves T during infusion of heated water passing from the boiler 7 through the brewing chamber 40. A drain 38 allows for release of the heated water out of the brewing chamber 40, the heated water having been transformed into the form of a brewed beverage V.

Figure 8:
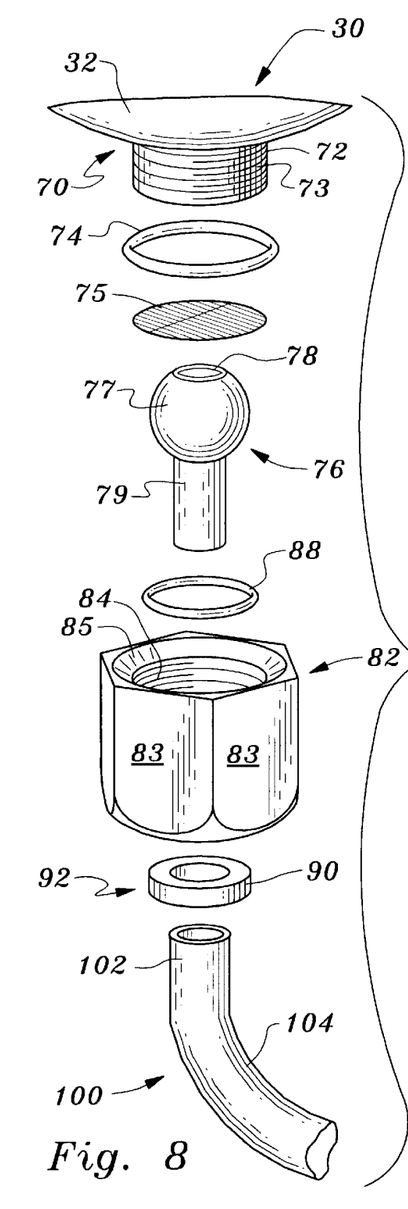
FIG. 8 is an exploded parts view of an attachment assembly for attaching the outlet tube to the discharge of the brewing enclosure of the porta-filter.

The drain 38 leads to a discharge 70 at a lowermost part of the brewing enclosure 30 of the porta-filter 20. An outlet tube 100 is attached to the discharge 70 through a ball joint 76 (FIGS. 8 and 9) and related structure which allow the outlet tube 100 to pivot both horizontally and vertically with respect to the porta-filter 20. The outlet tube 100 includes a lower end 110 out of which the beverage V can be discharged into a glass G for serving of the beverage V (FIG. 5). An outlet valve 120 is located adjacent the lower end 110 of the outlet tube 100. The outlet valve 120 provides an outflow restriction device which can enhance residence time of the heated water adjacent the tea leaves T or other brewable substances within the brewing chamber 40.

A layering tool 130 can be attached to the outlet tube 100 adjacent the lower end 110. The layering tool 130 includes a spoon attachment 150 oriented beneath the lower end 110 with a concave surface 172 facing the lower end 110. When the layering flow L of the beverage V' is discharged from the lower end 110, it strikes the spoon attachment 150 and is displaced in a horizontal direction, allowing the beverage V' to be dispersed onto a surface of a lower distinct layer of beverage V (FIG. 10) such that a multi-layer drink can be created. The spoon attachment 150 can pivot away from the lower end 110 when not in use.

Figure 6:
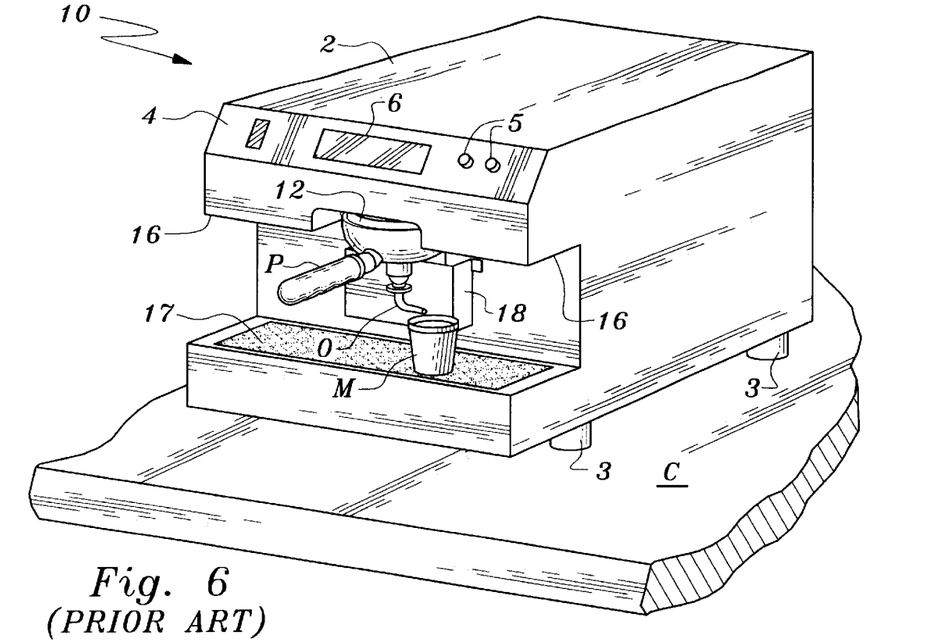
FIG. 6 is a perspective view similar to that which is shown in FIG. 5 but revealing a prior art porta-filter connected to the group head of the espresso machine with a small pitcher such as a demutante resting upon the drain tray for receipt of a brewed beverage therein.

More specifically, and with particular reference to FIGS. 5 and 6, details of the espresso machine 10 itself are described. The espresso machine 10 can be any of a variety of different machines which include a boiler 7 capable of producing heated water and directing the heated water to a brewing chamber 40 (FIGS. 1 and 2) for brewing of a beverage V. Preferably, the espresso machine 10 is of a type in common use in restaurants and coffee shops which rests upon a counter C with feet 3 and which is enclosed within a generally rectangular housing 2. A control panel 4 is located on a front side of the espresso machine 10 which includes a series of buttons 5 and a display 6 which facilitate operation of the espresso machine 10. While a particular arrangement of the control panel 4 is shown in FIGS. 5 and 6, a variety of different espresso machines 10 having manual, semi-automatic and fully automatic functionality are known which are each equally well adapted to use according to the invention particularly described herein.

Within the espresso machine 10, one essential feature common to all espresso machines 10 is a boiler 7 which is capable of producing heated water. Typically, such a boiler 7 would be fed by a water source to which the espresso machine 10 would be attached and various different structures such as insulation, heating elements, control wiring and the like would be provided adjacent to the boiler 7 and within the espresso machine 10 as is well known in the art. A steam outlet 8 extends from the boiler 7 and leads to the group head 12 of the espresso machine 10. Preferably, various forms of flow control out of the boiler 7 and along the steam outlet 8 are provided which are coupled to controls on the control panel 4.

While not required for the operation of this invention, it is preferable that an internal flow rate control valve 9 be provided on the steam outlet 8 which is adjustable to provide various different flow rates of heated water out of the boiler 7 and along the steam outlet 8 to the group head 12. Such an internal flow rate control valve 9 could either be preset at a desired level at a factory or be adjustable by an operator of the espresso machine 10. Flow rate control could similarly be provided by merely strategically selecting sizing for conduits forming the steam outlet 8.

Figure 1:
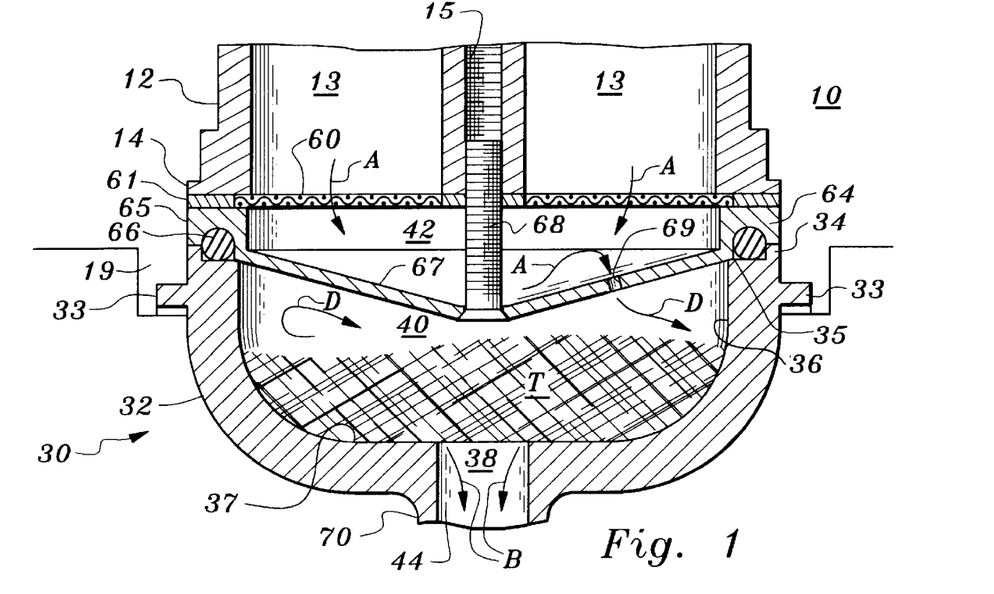
FIG. 1 is a full sectional view of a porta-filter of this invention attached to a group head of an espresso machine.

The group head 12 defines a region of the espresso machine 10 which interfaces with a porta-filter 20 where a brewing chamber 40 is located for brewing of brewable substances such as tea leaves T (FIGS. 1 and 2). Between the steam outlet 8 and the group head 12 a water pathway 13 is provided which extends vertically down through the group head 12 which defines an exit for heated water from the espresso machine 10. The water pathway 13 terminates at a lower rim 14. A threaded bore 15 is preferably located centrally within the water pathway 13 and has threads for receiving of a screw 62 for attachment of a filter 60 over the water pathway 13 of the group head 12 (FIGS. 1 and 2), as discussed below.

The group head 12 is preferably located in an overhang 16 of the espresso machine 10 which extends horizontally away from a front of the espresso machine 10 somewhat. A drain tray 17 is located below the overhang 16 and preferably extends slightly further from the espresso machine 10 than does the overhang 16. The drain tray 17 can include means to collect dripping liquids which fall down onto the drain tray 17 and can lead to a disposal area within the espresso machine 10. Typically, a pressure relief bypass shield 18 is located on a forward facing surface of the espresso machine 10 between the overhang 16 and the drain tray 17. The shield 18 deflects steam and heated water which is released when the porta-filter 20 is detached from the group head 12 and when necessary to maintain safe pressures within the espresso machine 10.

An attachment bracket 19 surrounds the group head 12 and is configured to allow the porta-filter 20 to sealingly attach in a secure manner adjacent the group head 12. The attachment bracket 19 can be fitted with O-rings, seals, gaskets, grommets or other sealing devices such that the porta-filter 20 can attach to the group head 12 in a manner which precludes heated water from escaping from the porta-filter 20, even when the heated water is provided at a pressure which is elevated with respect to atmospheric pressure surrounding the espresso machine 10.

With particular reference to FIGS. 1–4, details of the porta-filter 20 of this invention are described. The porta-filter 20 is a separate rigid structure attachable to the group head 12 of the espresso machine 10. The porta-filter 20 includes a handle 22 extending therefrom with finger slots 24 on an underside of the handle 22. The handle 22 extends from a free end 26 substantially linearly to an attached end 28. The attached end 28 is affixed to the brewing enclosure 30 of the porta-filter 20.

The brewing enclosure 30 is a hollow semi-spherical structure having a spherical outer surface 32 to which the attached end 28 of the handle 22 is connected. Tapered tabs 33 also extend from the outer surface 32 on opposite sides of the brewing enclosure 30. The tapered tabs 33 interface with the attachment bracket 19 of the group head 12 (FIGS. 1 and 2) to allow the porta-filter 20 to be secured to the espresso machine 10 with the brewing enclosure 30 sealingly attached to the group head 12.

Specifically, the tapered tabs 33 have a taper which allows them to initially slide into slots in the attachment bracket 19. As the handle 22 of the porta-filter 20 is rotated, the tapered tabs 33 rotate further into slots in the attachment bracket 19, drawing the brewing enclosure 30 upwards against the group head 12 and the lower rim 14 such that gaskets, seals or other sealing devices between the brewing enclosure 30 and the group head 12 are compressed and a tight pressure withstanding seal is provided between the group head 12 and the brewing enclosure 30 of the porta-filter 20.

The brewing enclosure 30 includes a rim 34 defining an uppermost portion of the brewing enclosure 30. A step 35 is located on an inner side of the rim 34 which is located slightly below the rim 34 with a flat surface of the step 35 oriented substantially horizontally.

An inner surface 36 of the brewing enclosure 30 is substantially semi-spherical and maintains a substantially constant distance away from the outer surface 32 so that a wall of the brewing enclosure 30 between the inner surface 36 and the outer surface 32 is of substantially constant thickness. Preferably, the inner surface 36 is not truly semispherical but rather is cylindrical adjacent the rim 34 and then curvingly transitions into a substantially flat circular floor 37. A drain 38 extends down from the floor 37 at a central location in the floor 37.

The brewing enclosure 30 can be attached to the group head 12 in two distinct configurations. A preferred configuration, shown in FIG. 2, includes a tea support insert 50 nested within the brewing enclosure 30 with tea leaves T or other brewable substances resting within the tea support insert 50. In an alternative embodiment, shown in FIG. 1, no tea support insert 50 is utilized and the brewable substance such as tea leaves T are located directly within the brewing enclosure 30 adjacent the inner surface 36.

In either configuration, a brewing chamber 40 is defined within the brewing enclosure 30. In the preferred embodiment of FIG. 2, the brewing chamber 40 is located within the tea support insert 50. In the alternative embodiment of FIG. 1, the brewing chamber 40 is located adjacent the inner surface 46 within the brewing enclosure 30. In essence, the brewing chamber 40 is a region where a brewable substance such as tea leaves T can be located and through which heated water is allowed to pass. Within the brewing chamber 40 the heated water is provided with residence time adjacent the brewable substance such as tea leaves T for infusion of the heated water with dissolved flavor components of the tea leaves T to create a beverage V (FIG. 5).

Above the brewing chamber 40 an upper chamber 42 is provided in the alternative embodiment of FIG. 1 where turbulence can be generated to enhance the brewing process within the brewing chamber 40. A lower chamber 44 is located below the brewing chamber 40 in the preferred embodiment of FIG. 2 to provide clearance for discharge of a beverage V after infusion of heated water within the brewing chamber 40 of the preferred embodiment.

In the preferred embodiment (FIG. 2) the tea support insert 50 (also shown in FIG. 4) defines the brewing chamber 40 and provides a location where the brewable substance such as tea leaves T can be located during the brewing process. The tea support insert 50 includes an annular lip 52 which is configured to rest upon the step 35 adjacent the rim 34 of the brewing enclosure 30. A side wall 54 extends down from the annular lip 32 substantially cylindrically and transitions into a substantially planar horizontal bottom wall 56. A plurality of fenestrations 58 are located in the bottom wall 56. The walls 54, 56 are sized to rest adjacent the inner surface 36 of the brewing enclosure 30 so that the tea support insert 50 provides maximum volume for the brewing chamber 40.

The bottom wall 56 of the tea support insert 50 is located above the floor 37 of the brewing enclosure 30 when the annular lip 52 is resting upon the step 35. The lower chamber 44 is thus provided where heated water, having been brewed into a beverage V, can access the drain 38 of the brewing enclosure 38 and not have the fenestrations 58 partially blocked. Preferably, the fenestrations 58 are sized so that the brewable substance such as tea leaves T cannot pass through the fenestrations 58. Alternatively, a screen can be located within the drain 38 to capture tea leaves T or other brewable substances passing through the fenestrations 58. Also, the brewable substance can be located within a bag, such as a tea bag, in which case a size of the fenestrations 58 is not critical.

While preferably the brewable substance is whole tea leaves T, the brewable substance can alternatively be ground tea leaves, various different herbs and spices, generated from organic or other sources such as tree barks, flower petals, leaves, seeds, roots and other materials capable of having desirable substances extracted therefrom into heated water to produce a beverage V. One common feature of such brewable substances is that they benefit from residence time without compression adjacent the heated water to maximize an amount of infusion into the heated water and to maximize a concentration of the beverage V in as short a time as possible for efficiency in serving customers in a restaurant environment. Additionally, such brewable substances benefit from being extracted at higher temperatures than those typically achievable within an open glass G away from a heat source and which benefit from an elevated pressure environment for extraction of the most desirable soluble flavor particulates and other beverage components there from.

Because the tea support insert 50 is separate from the brewing enclosure 30, it can be readily removed from the brewing enclosure 30 and the porta-filter 20 for cleaning and refilling. The tea support insert 50 can also act as a lining and be formed from a different material than the brewing enclosure 30 if desired to enhance the overall operation of the apparatus and brewing process disclosed herein.

In the alternative embodiment shown in FIG. 1, the tea support insert 50 is removed and the brewable substance such as tea leaves T is located directly within the brewing enclosure 30 adjacent the inner surface 36. If desired, the brewing enclosure 30 can then be attached directly to the group head 12, such as is shown in FIG. 2, but without the tea support insert 50. A filter 60 is preferably located between the water pathway 13 of the group head 12 and the rim 34 of the brewing enclosure 30. The filter 60 includes an outer edge 61 which extends out to the lower rim 14 of the group head 12 and is sandwiched between the lower rim 14 and the rim 34 of the brewing enclosure 30. The filter 60 precludes brewable substances such as tea leaves T from potentially backing up into the water pathway 13 and up into the espresso machine 10.

In operation of the alternative embodiment shown in FIG. 1, brewable substances such as tea leaves T are prevented from passing down into the drain 38 and out of the brewing enclosure 30 through screens, such as the screen 75 (FIG. 8 and 9), so that the brewable substance such as tea leaves T are confined to a defined space.

If turbulence is desireable within the brewing chamber 40 of either the preferred embodiment of FIG. 2 or the alternative embodiment of FIG. 1, a restriction plate 64 can be sandwiched between the filter 60 and the rim 34 of the brewing enclosure 30 (FIG. 1). The restriction plate 64 essentially is a solid plate of material having a perimeter 65 which extends out to the lower rim 14 of the group head 12 and the rim 34 of the brewing enclosure 30. An O-ring 66 is preferably located below the perimeter 65 to assist in providing a pressure resistant seal for the brewing enclosure 30 and the group head 12. A lower wall 67 of the restriction plate 64 attaches to the threaded bore 15 of the group head 12 through a long screw 68. If the restriction plate 64 is not utilized, a screw 62 is utilized merely to attach the filter 60 adjacent the group head 12 by threading into the threaded bore 15. When the restriction plate 64 is utilized, the screw 62 is replaced with the long screw 68 and the long screw 68 holds both the restriction plate 64 and filter 60 adjacent the group head 12.

At least one hole 69 passes through the lower wall 67 of the restriction plate 64. The hole 69 is strategically sized and located to maximize velocity of heated water passing into the brewing chamber 40 beneath the lower wall 67 of the restriction plate 64, along arrow A (FIG. 1). For instance, if the hole 69 is spaced to one side of the brewing chamber 40 the brewable substance such as tea leaves T will be significantly agitated by the spray of heated water passing through the hole 69 and into the brewing chamber 40. Such agitation, in the case of tea leaves T generates turbulence within the brewing chamber 40 and enhances a rate of infusion of tea particles into the heated water, more rapidly producing the beverage V at a desired concentration. While the restriction plate 64 is shown with the brewing enclosure 30 and without the tea support insert 50, it is recognized that the restriction plate 64 could in fact be used along with the tea support insert 50 of the preferred embodiment so that additional turbulence would be provided within the brewing chamber 40 and within the tea support insert 50.

The outer surface 32 of the brewing enclosure 30 transitions into a discharge 70 at a lowermost portion of the brewing enclosure 30. The discharge 70 can output the beverage V in a variety of different manners but preferably directs the beverage V to an outlet tube 100 first before discharge into a glass G. The discharge 70 (shown best in FIGS. 8 and 9) includes a drain extension 72 rigidly attached to the brewing enclosure 30 which has threads 73 on an outer surface thereof. The drain 38 passes out of the brewing chamber 40 within the brewing enclosure 30 and down into an interior of the drain extension 72.

A top O-ring 74 preferably surrounds the drain extension 72 adjacent the outer surface 32 of the brewing enclosure 30. A screen 75 is sized to overlie a lower surface of the drain extension 72. The screen 75 preferably has a mesh which precludes brewable substances such as tea leaves T located within the brewing enclosure 30 from passing down into the outlet tube 100 and out of the porta-filter 20 entirely. A ball joint 76 is located below the screen 75 which includes a ball 77 at an upper end thereof having a top hole 78 therein and an extension 79 at a lower end thereof. A bore 80 extends from the top hole 78 of the ball joint 76 down to an outlet hole 81 at a bottom of the extension 79.

A nut 82 preferably secures the ball joint 76 and screen 75 adjacent the drain extension 72 so that the ball joint 76 is secured to the brewing enclosure 30 of the porta-filter 20. The nut 82 includes facets 83 on an outer surface thereof which allow a torque tool such as a wrench to apply rotational forces to the nut 82. The nut 82 includes a threaded inner wall 84 which has threads which match the threads 73 of the drain extension 72. A slope 85 is located at an uppermost end of the threaded inner wall 84. The slope 85 is sized to press against the top O-ring 74 and compress the top O-ring 74 against the outer surface 32 of the brewing enclosure 30. The top 0 ring 74 thus provides a seal to preclude liquid from migrating between the outer surface 32 of the brewing enclosure 30 and the nut 82.

Figure 9:
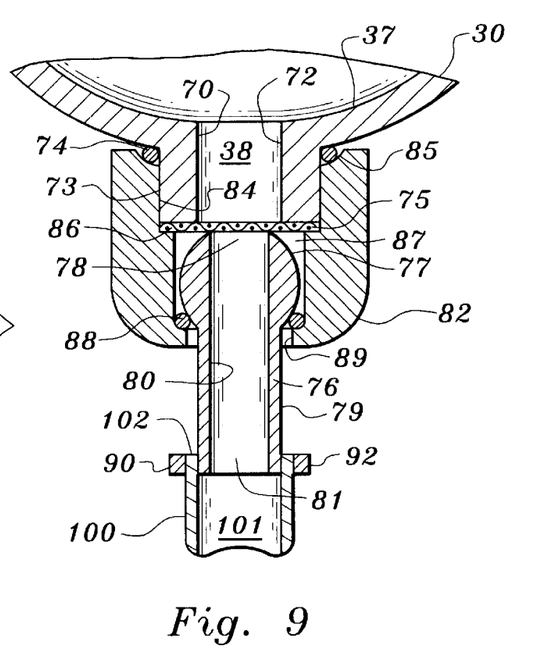
FIG. 9 is a full sectional view of a portion of that which is shown in FIG. 7 revealing details of the attachment assembly for attaching the outlet tube to the discharge of the brewing enclosure of the porta-filter.

A ledge 86 is located beneath the threaded inner wall 84 and within the nut 82 (FIG. 9). The ledge 86 is sized to allow the screen 75 to rest thereon and to prevent the screen 75 or drain extension 72 from passing down into a ball chamber 87 within a lower portion of the nut 82. The ball chamber 87 is preferably cylindrical and has a diameter greater than a diameter of the ball 77 of the ball joint 76. A lower O-ring 88 rests adjacent a lower hole 89 passing out of the nut 82. The lower O-ring 88 has a diameter greater than the lower hole 89 and less than a diameter of the ball chamber 87. The lower O-ring 88 also has a diameter less than a diameter of the ball 77. The lower O-ring 88 is provided with sufficient thickness that the ball 77 of the ball joint 76 remains adjacent the lower O-ring 88 and presses the lower O-ring 88 against the nut 82 adjacent the lower hole 89 even when the ball joint 76 is rotated such as when the outlet tube 100 is pivoted (FIG. 7).

Preferably, the lower hole 89 has a diameter which is sufficiently more than a diameter of the extension 79 that the ball joint 76 can pivot significantly before the extension 79 abuts against sides of the lower hole 89. With the nut 82 attached to the drain extension 72 of the discharge 70 of the brewing enclosure 30, and with the ball joint 76 trapped within the ball chamber 87, beverages V passing out of the drain 38 of the brewing enclosure 30 are forced to pass through the screen 75, through the bore 80 in the ball joint 76 and out of the outlet hole 81 in the ball joint 76 where the beverage V can then transition into the outlet tube 100, as described below.

Preferably, an end clamp 90 surrounds the outlet hole 81 in the ball joint 76 which clamps the extension 79 to the outlet tube 100. The bore 80 is thus in fluid communication with the interior conduit 101 of the outlet tube 100. A pivot restriction plate 92 (FIGS. 5 and 7) can either be separately attached to either the outer surface of the extension 79 or the outlet tube 100 or can double as a feature of the end clamp 90. The pivot restriction plate 92 acts to prevent the ball joint 76 from pivoting beyond a point at which the ball joint 76 can maintain a seal and beyond which damage to the ball joint 76 might occur. While the extension 79 is shown to be significantly longer than a height of the ball 77 in FIGS. 8 and 9, it is understood that a length of the extension 79 could be shortened, in which case the end clamp 90 could more easily double as the pivot restriction plate 92 to abut against the nut 82 when excessive pivoting of the outlet tube 100 has occurred.

Figure 7:
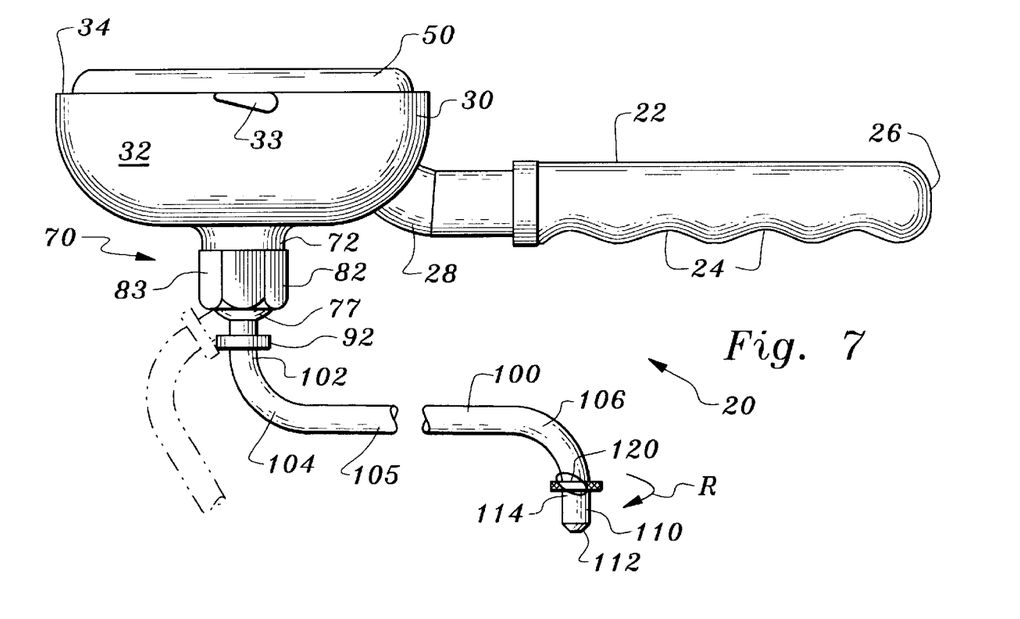
FIG. 7 is a side elevation view of the porta-filter of this invention with an outlet tube portion of the porta-filter extending from a lower end of the porta-filter, an alternative orientation for the outlet tube is shown in phantom revealing how the outlet tube can pivot with respect to the porta-filter.
Figure 10:
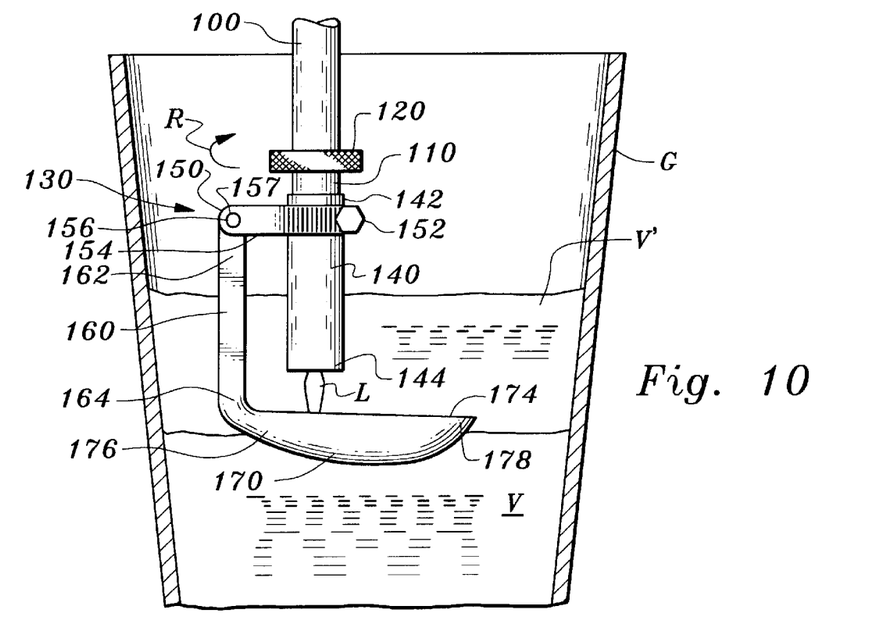
FIG. 10 is a side elevation view of a lower end of the outlet tube with a layering tool attached thereto and located within a glass with a multi-layer beverage therein and with the layering tool shown in operation producing the multi-layer beverage.
Figure 11:
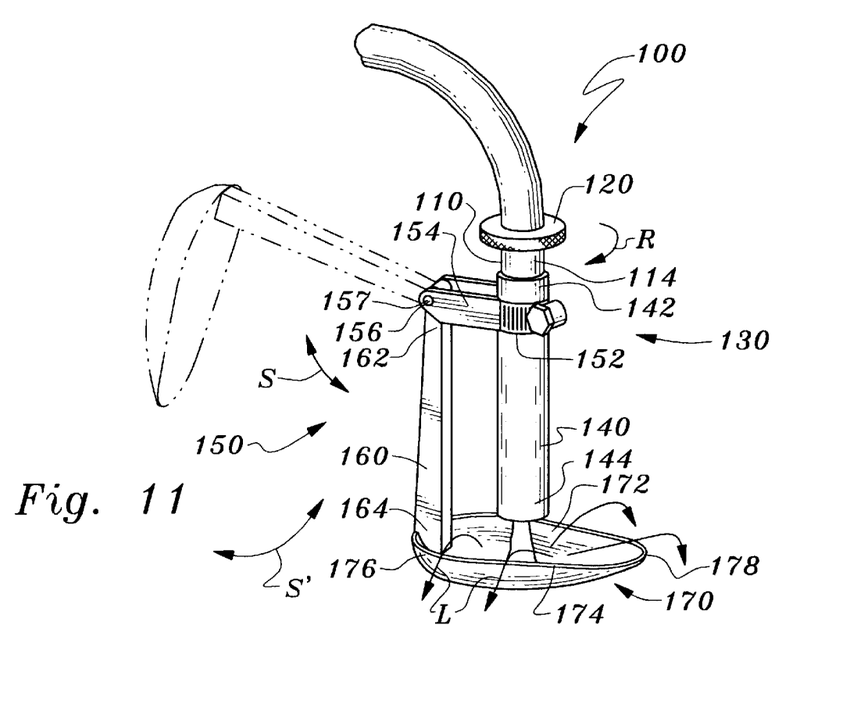
FIG. 11 is a perspective view of the lower end of the outlet tube and the layering tool of this invention with the layering tool additionally shown in phantom to reveal pivoting movement of the spoon attachment of the layering tool.

With particular reference to FIGS. 7, 10 and 11, details of the outlet tube 100 are described. The outlet tube 100 is preferably a tubular structure having a hollow interior conduit 101 extending from a top end 102 down to the lower end 110. Preferably, the outlet tube 100 includes an upper bend 104 of substantially 90° transitioning to a substantially linear middle 105 which in turn transitions into a lower bend 106 of substantially 90° and extending on down to the lower end 110.

The ball joint 76 allows the outlet tube to be rotated within a horizontal plane and pivoted vertically up and down. In this way, a glass G (FIG. 5) can rest upon the counter top C upon which the espresso machine 10 is located and not be located upon the drain tray 17 and still have a beverage V poured directly therein after it is brewed within the porta-filter 20. This eliminates the need to first fill a pitcher, such as a demutante M, resting upon the drain tray 17 and then later pour the beverage into the glass G. Because the outlet tube 100 can pivot up and down through action of the ball joint 76, the lower end 110 could in fact be pivoted up to a point where it would be above the top end 102.

While the outlet tube 100 is preferably substantially rigid between the top end 102 and the lower end 110, the outlet tube 100 preferably can be bent somewhat by flexing forces such as those applied by the hands of a user of the espresso machine 10. Preferably, the outlet tube 100 remains in a fixed orientation when only gravitational forces and forces generated by flow of a beverage V through the interior conduit 101 are acting on the outlet tube 100. In this way, once the outlet tube 100 is configured as desired, a user of the espresso machine 10 can attend to other activities without concern that the outlet tube 100 will undesirably bend out of position and result in spilling of the beverage V.

By allowing the outlet tube 100 to be flexed somewhat when bending forces are applied by the hands of a user of the espresso machine 10, additional configurations for the outlet tube 100 can be provided. For instance, if a sufficient number of bends such as the upper bend 104 and lower bend 106 are provided in the outlet tube 100, a length with which the outlet tube 100 extends away from the porta-filter 20 can be increased and decreased. If the outlet tube 100 is configured in a helical coil, a large amount of elongation of the outlet tube 100 would be achievable without crimping the outlet tube 100 and blocking the interior conduit 101.

While the outlet tube 100 is preferably formed from a non-reactive metal such as stainless steel, the outlet tube 100 could also be formed from an appropriate sanitizable hydrocarbon substance such as a plastic or rubber material. If desired, the outlet tube 100 could be provided with considerable flex such that the outlet tube 100 in essence is provided as a hose extending from the porta-filter 20.

Preferably, the lower end 110 includes a nozzle 112 and is defined by a cylindrical wall 114 adjacent the lower end 110. An outlet valve 120 is preferably located on the outlet tube 100 adjacent the lower end 110. The outlet valve 120 acts as an outflow restriction device for beverages V passing through the outlet tube 100. The outlet valve 120 can additionally coact with the nozzle 120 in a manner which increases and decreases a velocity of the beverage V as it exits the lower end 110. Such velocity in turn enhances aeration of the beverage V as the beverage V is dispensed into a glass G.

The outlet valve 120 is preferably manually adjustable, such as along arrow R, by rotating the outlet valve 120 or by manipulating a lever or other manually controllable actuation device. Hence, the outlet valve 120 can be utilized to aerate the beverage V or to restrict a flow rate of the beverage V passing out of the lower end 10 of the outlet tube 100. The outlet valve 120 preferably is sufficiently adjustable that it can go from one extreme where the lower end 110 of the outlet tube 100 is entirely blocked to an opposite extreme where the outlet tube 100 is not blocked at all but rather has a totally open interior conduit 101 without restriction.

With particular reference to FIGS. 10 and 11, details of a layering tool 130 which is attachable to the lower end 110 of the outlet tube 100 are described. The layering tool 130 is utilized to allow a distinct layer of beverage V' to be placed upon a beverage V in a distinct separate layer within a glass G. The layering tool 130 includes a tubular sleeve 140 sized to overlie the cylindrical wall 114 of the lower end 110 of the outlet tube 100. The tubular sleeve 140 has an upper end 142 which attaches to the lower end 110 of the outlet tube 100 and an outlet end 144 where the layering flow L of the distinct layer of beverage V' is discharged.

A spoon attachment 150 attaches to the tubular sleeve 140 preferably near the upper end 142 of the tubular sleeve 140. The spoon attachment 150 utilizes a clamp 152 which surrounds the tubular sleeve 140 adjacent the upper end 142 and compresses the tubular sleeve 140 against the cylindrical wall 114 of the lower end 110 to secure the layering tool 130 to the outlet tube 100. A bracket 154 is attached to the clamp 152 which has a pivot 156 at an end thereof distant from the clamp 152. A pin 157 passes through the pivot 156.

An arm 160 attaches to the pin 157 and is allowed to freely pivot upon the pin 157 relative to the bracket 154, the tubular sleeve 140 and the lower end 110. As shown in FIG. 11, the arm 160 has two positions between which the arm 160 can rotate, along arrow S, including a deployed position blocking the outlet end 144 of the tubular sleeve 140 and an out of position orientation where the outlet end 144 of the tubular sleeve 140 remains unblocked. The arm 160 includes a top 162 to which the arm 160 attaches to the pin 157 and a bottom 164 opposite the top 162. The arm 160 preferably extends linearly between the top 162 and the bottom 164.

A spoon 170 is attached to the bottom 164. The spoon 170 includes a concave surface 172 on an upper portion of the spoon 170 which faces the outlet end 144 of the tubular sleeve 140 when the arm 160 is in its deployed position. The concave surface 172 is bounded by an edge 174 defining a maximum height portion of the spoon 170. The spoon 170 attaches to the bottom 164 of the arm 160 at a base end 176. The spoon 170 extends away from the base end 176 to a tip 178. The concave surface 172 can include a variety of different configurations but preferably is slightly concave and substantially semi-spherical in overall form.

While the arm 160 is shown capable of pivoting along arrow S between a deployed position and a position away from the outlet end 144 of the tubular sleeve 140, the arm 160 could alternatively pivot along arrow S' in a side to side fashion to either side of the outlet end 144 to leave the outlet end 144 free to direct a beverage V directly into the glass G.

With particular reference to FIGS. 1 and 2, details of the operation of the espresso machine 10 and porta-filter 20 as provided by this invention is described. Initially, a user selects a brewable substance to be brewed with heated water from the boiler 7 of the espresso machine 10. The brewable substance can include tea leaves T or other substances such as herbs, spices or grounds of a coffee bean. The brewable substance such as tea leaves T is located within the brewing chamber 40, either above the tea support insert 50 (FIG. 2) or within the brewing enclosure 30 without the tea support insert 50 utilized (FIG. 1). If enhanced turbulence is desired within the brewing chamber 40, the restriction plate 64 is fitted between the brewing enclosure 30 and the group head 12.

The espresso machine 10 is then activated so that heated water is discharged from the boiler 7, passes through the steam outlet 8 and through the internal flow rate control valve 9 and to the water pathway 13 of the group head 12. If a specific flow rate for input of heated water into the brewing chamber 40 is desired, the control panel 40 can be manipulated by the user to cause the internal flow rate control valve 9 to be adjusted to the desired flow rate. The heated water then passes at the desired flow rate out of the water pathway 13 of the group head 12, along arrow A, through the filter 60 and out of the group head 12.

If the restriction plate 64 is in place, the heated water passes into the upper chamber 42 where it is then forced through the hole 69 at velocity to generate turbulence within the brewing chamber 40 (FIG. 1). If the restriction plate 64 is not utilized, the heated water passes from the water pathway 13 through the filter 60, along arrow A, and into the brewing chamber 40 located within the tea support insert 50. Turbulence, represented by arrow D, is enhanced when the restriction plate 64 is utilized.

The heated water is brought into contact with the brewable substance such as tea leaves T within the brewing chamber 40. At this time, the heated water is infused with desirable soluble flavor particles from the tea leaves T in an extraction process so that the heated water is transformed into the beverage V. The beverage V will have varying concentrations depending on factors such as the residence time that the heated water experiences adjacent the tea leaves T within the brewing enclosure 40 and other factors such as pressure within the brewing chamber 40 and turbulence within the brewing chamber 40.

Other factors affecting the rate of extraction of tea flavor particles out of the tea leaves T and infusion of the tea particles into the heated water include the temperature of the heated water during the infusion process. Preferably, the heated water is infused with tea at a constant temperature of 205° F. However, depending on the type of tea or other brewable substances located within the brewing chamber 40, various different optimal temperatures might be utilized.

The amount of residence time that the heated water experiences adjacent the brewable substance such as tea leaves T can be controlled by adjustment of the outlet valve 120 on the outlet tube 100. Alternatively, the outlet valve 120 can be located on the porta-filter 120 itself or at any location between the brewing chamber 40 and a location at which the beverage V is discharged into a glass G. The outlet valve 120 could also conceivably be removed all together with a point of restriction of beverage V flow provided where a lesser flow rate is allowed for the beverage V than the flow rate provided for heated water inflow from the boiler 7 into the brewing chamber 40.

In essence, so long as a rate of inflow of heated water into the brewing chamber 40 is greater than a rate of outflow of beverage V out of the brewing chamber 40, some residence time for the heated water adjacent the brewable substance such as tea leaves T is provided. This residence time can then be enhanced by increasing a differential between the flow rate into the brewing chamber 40 and the flow rate out of the brewing chamber 40. The outlet valve 120 can either be at a constant setting throughout the brewing process or can be adjusted during the brewing process. For instance, the outlet valve 120 can be initially substantially closed so that residence time is maximized and then opened to an amount which substantially matches that of inflow of heated water into the brewing chamber 40. In this way, heated water would enter the brewing chamber 40, be infused with particles from the brewable substance such as the tea leaves T and then, after brewing has occurred, be discharged into the glass G.

Preferably however, the outlet valve 120 remains at a constant setting throughout the brewing process so that a user of the espresso machine 10 does not need to monitor the brewing process. The outlet valve 120 is adjusted, by rotation about arrow R (FIGS. 7 and 11) to a setting which produces a desired concentration for the beverage V. When the outlet valve 120 is more closed, a greater amount of residence time is provided within the brewing chamber 40 and hence a higher concentration "stronger" beverage V results. Conversely, when the outlet valve 120 is more open a concentration of the beverage V is lessened.

As the heated water is changed into the beverage V, the beverage V then passes through the fenestrations 58 in the tea support insert 50 and then into the lower chamber 44 before passage on into the drain 38 and the brewing enclosure 30. The drain 38 then leads down into the bore 80 and the ball joint 76 and on into the interior conduit 101 in the outlet tube 100. The interior conduit 101 extends down through the outlet tube 100 to the nozzle 112 at the lower end 110. The outlet valve 120 is also passed by the beverage V with appropriate flow rate control occurring adjacent the outlet valve 120. The outlet valve 120 also controls velocity of discharge of the beverage V out of the nozzle 112 at the lower end 110. When velocity is increased through manipulation of the outlet valve 12, by rotation about arrow R, a greater amount of aeration occurs within the glass G, producing a desirable appearance and oxygenating the beverage to enhance the flavor of many beverages V. If no aeration is desired, the outlet valve 120 altered to decrease velocity of the beverage V as it exits the nozzle 112.

Should a layered drink be desired within the glass G, the layering tool 130 can be attached to the lower end 110 of the outlet tube 100 by manipulating the clamp 152 of the spoon attachment 150 with the tubular sleeve 140 of the layering tool 130 overlying the lower end 110 of the outlet tube 100. The spoon 170 is then located in its deployed position beneath the outlet end 144 of the tubular sleeve 140 so that layering flow L is diverted from an initial vertical direction from the outlet end 144 to a substantially horizontal direction. The layering flow L can then flow out onto a surface of the beverage V creating a distinct layer of beverage V' resting upon the beverage V. The spoon 170 can then be swung out of position along arrow S, or alternatively along arrow S', should the outlet tube 100 be utilized in a non-layering fashion temporarily when a user desires to keep the layering tool 130 attached to the lower end 110 of the outlet tube 100.

Moreover, having thus described the invention it should be apparent that various different modifications could be resorted to without departing from the scope and fair meaning of the invention as disclosed herein. For instance, while various different brewable substances have been identified for use within the brewing chamber 40, it is understood that many other brewable substances could be utilized which benefit from residence time, turbulence and enhanced pressure during an infusion, extraction or other brewing process without requiring initial compression. Also, the various different devices utilized for liquid flow control, pivoting and other manipulation of components of this invention are not the only devices capable of producing the desired function but rather are provided as representative devices believed to define a best mode for practicing the invention. The specific embodiment disclosed herein is included to provide an enabling disclosure and best mode for practicing this invention and is not intend to limit the claims.

What is claimed is:

1. A method for brewing tea including the steps of:
    providing an espresso machine including a water boiler therein and a group head coupled to the boiler, the group head providing an exit from the espresso machine for water from the boiler, the group head including means to attach in a removable sealing manner with a brewing enclosure;
    providing the brewing enclosure with a brewing chamber therein and an outlet, the outlet at a lower end of a hollow outlet tube, the tube attached to the brewing enclosure in a movable fashion, such that the lower end of the outlet tube can be adjustably positioned while the brewing enclosure remains stationary, a flow rate restriction means located between the brewing chamber and the outlet;
    configuring the group head and the brewing enclosure to attach in a removable sealing manner to each other such that water from the boiler can pass out of the group head, through the brewing chamber of the brewing enclosure and to the outlet;
    locating a brewable substance derived from a tea plant within the brewing chamber;
    attaching the brewing enclosure to the group head;
    passing water from the boiler of the espresso machine through the group head exit to the brewing chamber of the brewing enclosure, adjacent the brewable substance and out of the outlet, where the water has become tea;
    maintaining a pressure above atmospheric pressure within the brewing chamber during at least a portion of said passing step; and
    agitating the water and the brewable substance within the brewing chamber with agitation sufficient to move the brewable substance within the brewing chamber.

2. The method of claim 1 wherein said passing step includes the step of restricting the flow of water between the brewing chamber and the outlet to a flow rate which is less than a flow rate of the water into the brewing chamber, at least initially, such that the water backs up within the brewing chamber and has residence time with the brewing substance within the brewing chamber.

3. The method of claim 2 wherein said restricting step includes the step of interposing an adjustable flow rate outlet valve on the outlet tube which can be adjusted to change a flow rate of the water passing out of the outlet.

4. The method of claim 1 wherein said locating step includes the steps of:
    initially enclosing the brewable substance within a tea bag through which water can pass but through which the brewable substance cannot escape; and
    positioning the tea bag within the brewing chamber.

5. A method for brewing a beverage from a brewable substance of tea leaves, herbs, or spices with heated water supplied by an espresso machine having a boiler therein and a group head defining an exit for heated water from the boiler of the espresso machine, the method including the steps of:

attaching a brewing enclosure having a brewing chamber therein to the group head, the brewing enclosure sealingly attaching to the group head such that heated water from the boiler of the espresso machine passes into the brewing chamber, said brewing chamber large enough to support a brewable substance therein;

placing the brewable substance into the brewing chamber;

restricting heated water outflow from the brewing chamber to a rate less than a maximum rate of brewing chamber water inflow, such that the heated water has residence time adjacent the brewable substance;

maintaining a pressure above atmospheric pressure within the brewing chamber during at least a portion of time that the heated water has residence time adjacent the brewable substance;

introducing turbulence into the heated water while the heater water has residence time adjacent the brewable substance;

agitating the water and the brewable substance within the brewing chamber with agitation sufficient to move the brewable substance within the brewing chamber; and outputting a beverage resulting from the heated water residing adjacent the brewable substance.

6. The beverage brewing method of claim 5 wherein said restricting step includes the step of interposing an outlet valve between the brewing chamber and an output for heated water from the brewing chamber, the outlet valve including means to adjust a flow rate of heated water passing there through, the outlet valve including a substantially closed position, and at least two open positions having different flow rates.

7. The beverage brewing method of claim 5 including the further step of interposing a brewable substance barrier between the brewing chamber and the outlet, the brewable substance barrier including means to allow passage of liquids there through but preventing the passage of the brewable substance there through.

8. A method for brewing a beverage from a brewing substance of tea leaves, herbs, or spices with heated water supplied by an espresso machine having a boiler therein and a group head defining an exit for heated water from the boiler of the espresso machine, the method including the steps of:

attaching a brewing enclosure having a brewing chamber therein to the group head, the brewing enclosure including means to sealingly attach to the group head such that heated water from the boiler of the espresso machine passes into the brewing chamber, said brewing chamber large enough to support a brewable substance therein;

placing the brewable substance into the brewing chamber;

restricting heated water outflow from the brewing chamber to a rate less than a rate of brewing chamber water inflow, such that the heated water has residence time adjacent the brewable substance;

outputting a beverage resulting from the heated water residing adjacent the brewable substance;

including the further step of interposing a brewable substance barrier between the brewing chamber and the outlet, the brewable substance barrier including means to allow passage of liquids there through but preventing the passage of the brewable substance there through;

including the further step of pressurizing the heated water within the brewing chamber such that the heated water is located adjacent the brewable substance at a pressure which is elevated with respect to atmospheric pressure surrounding the espresso machine;

including the further step of introducing turbulence into the heated water while the heated water has residence time adjacent the brewable substance, such that brewing time is decreased; and agitating the water and the brewable substance within the brewing chamber with agitation sufficient to move the brewable substance within the brewing chamber.

9. The beverage brewing method of claim 8 wherein said interposing step includes the step of configuring the brewable substance barrier as a removable insert locatable within the brewing chamber, the insert including fenestrations in a floor thereof which are sized smaller than individual pieces of the brewable substance such that the brewable substance cannot pass through the fenestrations and out of the insert.

10. The beverage brewing method of claim 8 including the further step of locating an outlet tube down stream from the brewing chamber, the outlet tube having a hollow interior extending down to a lower end, the outlet tube including means to adjust a position of the lower end of the outlet tube relative to the brewing chamber in both a vertical and a horizontal direction for discharge of a beverage resulting from the beverage brewing method.

11. The beverage brewing method of claim 8 wherein said placing step includes the step of enclosing the brewable substance within a bag, the bag having sufficient porosity to allow water to pass there through but insufficient porosity to allow the brewable substance to escape from the bag, the bag located above the brewable substance barrier and within the brewing chamber.

12. A method for brewing tea with an espresso machine including the steps of:

providing an espresso machine including a water boiler therein and a group head coupled to the boiler, the group head providing an exit from the espresso machine for water from the boiler;

providing a brewing enclosure with a brewing chamber therein and an outlet, the brewing enclosure configured to be attached to the group head in a manner causing water exiting the group head to pass into the brewing chamber;

placing tea leaves within the brewer chamber;

connecting the brewing enclosure to the group head;

releasing water from the boiler of the espresso machine, through the group head and into the brewing chamber;

holding at least a portion of the water at least temporarily within the brewing chamber, such that at least a portion of the water has residence time adjacent the tea leaves;

maintaining a pressure above atmospheric pressure within the brewing chamber during at least a portion of said holding step;

agitating the water and the brewable substance within the brewing chamber with agitation sufficient to move the brewable substance within the brewing chamber; and releasing water out of the outlet in the form of a tea beverage.

13. The method of claim 12 wherein said releasing step includes the step of entering water into the brewing chamber in a manner which generates turbulence within the brewing chamber sufficient to increase a rate of infusion of flavor particles from the tea leaves into the water within the brewing chamber.

14. The method of claim 12 wherein said holding step lasts for a sufficient time duration that at least some infusion occurs between the tea leaves and the water.

15. The method of claim 14 wherein said holding step includes the step of interposing a valve between the brewing chamber and the outlet, the valve having a first position more closed than a second position; and     adjusting the valve from the first position to the second position after the water has been held adjacent the tea leaves until a desired amount of infusion of tea flavor particles into the water has occurred.

16. The method of claim 12 wherein said releasing the water out of the outlet step occurs after a desired amount of residence time of the water adjacent the tea leaves is complete.

17. A method for brewing tea including the steps of:

providing a source of hot water, the source of hot water having a water exit;

providing a brewing chamber having a water entrance and a tea outlet, the brewing chamber sealingly attached to the exit from the source of hot water;

placing tea leaves within the brewing chamber;

releasing hot water from the source of hot water, through the exit and into the brewing chamber;

holding at least a portion of the hot water at least temporarily within the brewing chamber, such that at least a portion of the water has residence time adjacent the tea leaves;

maintaining a pressure above atmospheric pressure within the brewing chamber during at least a portion of time that the heated water has residence time adjacent the tea leaves;

agitating the water and the tea leaves within the brewing chamber with agitation sufficient to move the tea leaves within the brewing chamber; and     releasing the water out of the outlet in the form of a tea beverage.

18. The method of claim 17 including the further step of interposing a valve between the source of hot water and the brewing chamber.

19. The method of claim 17 wherein said providing a brewing chamber step includes positioning the outlet at a lower end of a hollow outlet tube, the tube attached to the brewing chamber in a vertically movable fashion, such that the lower end of the outlet tube can be adjustably positioned vertically while the brewing chamber remains stationary.

20. A method for brewing tea including the steps of:

providing a source of hot water including a hot water exit;

providing a brewing chamber having an entrance coupled to the exit of the source of hot water and an outlet;

placing tea leaves within the brewing chamber;

releasing hot water from the source of hot water and into the brewing chamber;

holding at least a portion of the water at least temporarily within the brewing chamber, such that at least a portion of the water has residence time adjacent the tea leaves;

maintaining a pressure above atmospheric pressure within the brewing chamber during at least a portion of said holding step;

agitating the water and the tea leaves within the brewing chamber with agitation sufficient to move the tea leaves within the brewing chamber; and     releasing the hot water out of the outlet in the form of a tea beverage.

21. The method of claim 20 wherein the entrance of said brewing chamber providing step is sealingly attached to the exit of the source of hot water.

22. The method of claim 20 including the further step of interposing a valve between the source of hot water and the brewing chamber.

23. The method of claim 20 wherein said providing a brewing chamber step includes positioning the outlet at a lower end of a hollow outlet tube, the tube attached to the brewing chamber in a vertically movable fashion, such that the lower end of the outlet tube can be adjustably positioned vertically while the brewing chamber remains stationary.

24. A method for brewing a beverage from a brewable substance of tea leaves, herbs, or spices beans including the steps of:

providing a source of hot water having a hot water exit;

providing a brewing chamber having an entrance and an outlet, the entrance coupled to the exit of the source of hot water;

placing the brewable substance within the brewing chamber;

releasing hot water from the source of hot water and into the brewing chamber;

holding at least a portion of the hot water at least temporarily within the brewing chamber, such that at least a portion of the water has residence time adjacent the brewable substance;

maintaining a pressure above atmospheric pressure within the brewing chamber during at least a portion of time that the heated water has residence time adjacent the brewable substance;

agitating the hot water and the brewable substance during at least a portion of said holding step with agitation sufficient to move the brewable substance within the brewing chamber; and     releasing the hot water out of the outlet of the brewing chamber in the form of a brewed beverage.

25. The method of claim 24 including the further step of releasably and sealingly coupling the entrance of the brewing chamber to the exit of the source of hot water.

26. The method of claim 24 including the further step of interposing a valve between the source of hot water and the brewing chamber.

27. The method of claim 24 wherein said providing a brewing chamber step includes positioning the outlet at a lower end of a hollow outlet tube, the tube attached to the brewing chamber in a vertically movable fashion, such that the lower end of the outlet tube can be adjustably positioned vertically while the brewing chamber remains stationary.

28. A method for brewing tea including the steps of:

providing a source of hot water;

providing a brewing chamber having an entrance connectable to the source of hot water and an outlet;

interposing a valve between the source of hot water and the brewing chamber;

placing tea leaves within the brewing chamber;

releasing water from the source of hot water and into the brewing chamber;

holding at least a portion of the water at least temporarily within the brewing chamber, such that at least a portion of the water has residence time adjacent the tea leaves;

maintaining a pressure above atmospheric pressure within the brewing chamber during at least a portion of time that the heated water has residence time adjacent the tea leaves;

agitating the water and the tea leaves within the brewing chamber with agitation sufficient to move the tea leaves within the brewing chamber; and releasing the water out of the outlet in the form of a tea beverage.

29. The method of claim 28 including the further step of removably and sealingly connecting the entrance of the brewing chamber to the source of hot water after said placing step and before said step of releasing hot water from the source of hot water and into the brewing chamber.

30. The method of claim 28 wherein said providing a brewing chamber step includes positioning the outlet at a lower end of a hollow outlet tube, the tube attached to the brewing chamber in a vertically movable fashion, such that the lower end of the outlet tube can be adjustably positioned vertically while the brewing chamber remains stationary.

31. A method for brewing a beverage from a brewable substance such as tea leaves, herbs, spices or ground coffee beans including the steps of:

providing a source of hot water having a hot water exit;

providing a brewing chamber having an entrance and an outlet, the entrance coupled to the exit of the source of hot water, the outlet at a lower end of a hollow outlet tube, the tube attached to the brewing chamber in a vertically movable fashion, such that the lower end of the outlet tube can be adjustably positioned vertically while the brewing chamber remains stationary;

placing the brewable substance within the brewing chamber;

releasing hot water from the source of hot water and into the brewing chamber;

holding at least a portion of the hot water at least temporarily within the brewing chamber, such that at least a portion of the water has residence time adjacent the brewable substance;

agitating the hot water and the brewable substance during at least a portion of said holding step; and releasing the hot water out of the outlet of the brewing chamber in the form of a brewed beverage.

\* \* \* \* \*